(12) United States Patent
Hymel et al.

(10) Patent No.: US 8,798,601 B2
(45) Date of Patent: Aug. 5, 2014

(54) VARIABLE INCOMING COMMUNICATION INDICATORS

(75) Inventors: James Allen Hymel, Kitchener (CA); Finbarr Michael O'Carroll, Ocean Ridge, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 215 days.

(21) Appl. No.: 13/215,606

(22) Filed: Aug. 23, 2011

(65) Prior Publication Data

US 2013/0053008 A1 Feb. 28, 2013

(51) Int. Cl.
*H04W 4/16* (2009.01)
*H04W 4/12* (2009.01)

(52) U.S. Cl.
USPC ........................................................ 455/415

(58) Field of Classification Search
USPC ............... 455/415, 466, 566, 550.1; 715/736; 717/124; 345/619
See application file for complete search history.

(56) References Cited

U.S. PATENT DOCUMENTS

| | | | | |
|---|---|---|---|---|
| 2006/0098027 A1* | 5/2006 | Rice et al. | ..................... | 345/619 |
| 2007/0288898 A1* | 12/2007 | Isberg | ............................. | 717/124 |
| 2008/0088700 A1 | 4/2008 | Mornhineway et al. | | |
| 2008/0132254 A1* | 6/2008 | Graham et al. | ................. | 455/466 |
| 2009/0311999 A1* | 12/2009 | Sarkar et al. | ................... | 455/415 |
| 2009/0319905 A1* | 12/2009 | Loeb et al. | ..................... | 715/736 |
| 2010/0015959 A1* | 1/2010 | Yu | ................................. | 455/414.1 |
| 2011/0014932 A1 | 1/2011 | Estevez | | |
| 2012/0233208 A1* | 9/2012 | Belz et al. | ..................... | 707/769 |

FOREIGN PATENT DOCUMENTS

WO 2004017596 2/2004

OTHER PUBLICATIONS

Extended European Search Report for EP Application 11178518.4 dated Jan. 25, 2012.

* cited by examiner

*Primary Examiner* — Melody Mehrpour
(74) *Attorney, Agent, or Firm* — Jose Gutman; Fleit Gibbons Gutman Bongini & Bianco PL

(57) ABSTRACT

An electronic device receives an incoming communication including an originating address. A user associated with the originating address is identified. A set of attributes associated with the incoming communication is identified. At least one incoming communication indicator presentation rule is selected based on at least one of the user that has been identified and the set of attributes that have been identified. An incoming communication indicator is presented based on the incoming communication indicator presentation rule that has been selected.

18 Claims, 13 Drawing Sheets

123

| CONTACT 202 | PHONE NUMBER(S) 208 | EMAIL ADDRESS(ES) 210 | P2P ADDRESS 212 | IMAGES 226 | SOCIAL NETWORKING INFORMATION 232 | INDICATOR RULE(S) 238 | ... |
|---|---|---|---|---|---|---|---|
| CONTACT A 204 | 555-123-4567 214 | contacta@...com 218 | P2P_A 222 | IMAGE_1 228 | HAPPY 234 | RULE 1 RULE X ... | ... 240 |
| CONTACT B 206 | 555-234-5678 216 | contactb@...com 220 | P2P_B 224 | N/A 230 | EXCITED 236 | N/A ... | ... |
| CONTACT C | 555-345-8769 | contactc@...com | P2P_C | IMAGE_2 IMAGE_3 | | RULE 2 ... | ... 242 |
| ... | | | ... | ... | | | ... |
| CONTACT N | 555-123-3456 | contactn@...com | P2P_N | IMAGE_4 IMAGE_5 IMAGE_6 ... | N/A | RULE N ... | ... |

FIG. 2

VARIABLE INCOMING COMMUNICATION INDICATORS

FIELD OF THE DISCLOSURE

The present disclosure generally relates to communication devices, and more particularly relates to presenting incoming communication indicators on an electronic device.

BACKGROUND

Users of communication devices are generally notified of incoming communications via static mechanisms. For example, when a device receives a phone call the telephone number of the caller or a static image of the caller is usually displayed to the user of the device. As can be seen, this type of incoming communication notification is static and one dimensional and is not very informative.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 shows user contact information according to one example;

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e., open language). The term "coupled" as used herein, is defined as "connected" although not necessarily directly, and not necessarily mechanically.

The terms "wireless communication device" and "mobile device" are used herein interchangeably and are intended to broadly cover many different types of devices that can wirelessly receive signals, and in most cases can wirelessly transmit signals, and may also operate in a wireless communication system. For example, and not for any limitation, these devices can include any one or a combination of the following: a two-way radio, a cellular telephone, a mobile phone, a smartphone, a two-way pager, a wireless messaging device, a laptop/computer, a personal digital assistant, a tablet computing device, and other similar devices.

Described below are systems and methods for presenting incoming communication indicators to a user on an electronic device. An incoming communication comprising an originating address is received. A user associated with the originating address is identified. A set of attributes associated with the incoming communication is identified. At least one incoming communication indicator presentation rule is selected based on at least one of the user and the set of attributes that have been identified. An incoming communication indicator is presented based on the incoming communication indicator presentation rule that has been selected.

Operating Environment

Figure 1:
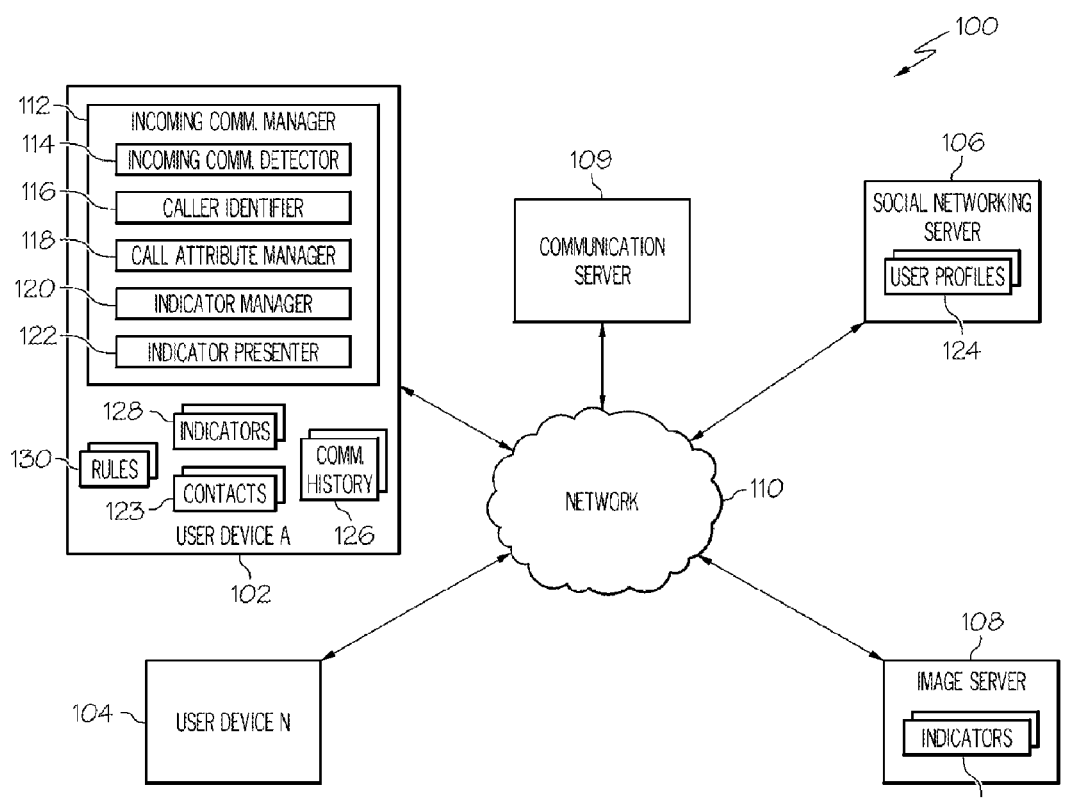
FIG. 1 is a block diagram of an operating environment according to one example.

FIG. 1 is a block diagram illustrating one example of an operating environment 100 for dynamically presenting indicators on an electronic device that represent one or more attributes of an incoming call, caller, or both. The indicators may be visual, audible, tactile or any combination thereof. The operating environment 100 comprises a plurality of user devices 102, 104 and systems 106, 108, 109 communicatively coupled to each other through one or more wireless networks 110. The wireless network(s) 110 can include one or more communication networks. The wireless communications standard(s) of the network(s) 110 can comprise Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), Orthogonal Frequency Division Multiple Access (OFDMA), Wireless LAN (WLAN), WiMAX or other IEEE 802.16 standards, Long Term Evolution (LTE), or any other current or future wireless communication standard. It should be noted that the operating environment 100 can also include a peer-to-peer (P2P) based messaging system (not shown) such as a PIN-based messaging system.

The user devices 102, 104 can be electronic devices such as, but not limited to, wireless communication devices, information processing systems such as notebooks, tablets and desktop computers, and the like. At least one user device 102 comprises an incoming communication manager (ICM) 112. In one example, the ICM 112 presents one or more visual indicators such as, but not limited to, images, video, colors, patterns, animations, or the like to the user of the device 102 based on one or more attributes associated with an incoming call. These attributes can include, for example, a current mood of the caller of the incoming call, the number of missed calls associated with the caller of the incoming call, the number of unread or missed communications (such as text messages, emails, instant messages, or the like), the urgency of the incoming call from the caller, how the user responds to the incoming call, and the like. It should be noted that the ICM 112 can also present audible and tactile indicators based on one or more attributes associated with an incoming call as well.

In one example, the ICM 112 comprises an incoming communication detector 114, a caller identifier 116, a call attribute manager 118, an indicator manager 120, and an incoming communication indicator presenter 122. The incoming communication detector 114 monitors for and detects an incoming communication. An incoming communication can be, for example, any type of phone or video call, a P2P communication, an instant message, a text message such as a Short Message Service (SMS) message or a Multimedia Messaging Service (MMS) message, an email, or the like. The caller identifier 116 identifies the party (i.e. "caller") that is requesting or has requested to communicate with the user of the device 102. For example, the user device 102, in one example, comprises a set of contact information 123 that, among other things, associates a communication address, such as a phone number, email address, P2P pin, instant messaging address, etc., with a name or other identifier. In one example, the set of contact information 123 comprises various types of contacts, such as phone book contacts, email contacts, buddy lists, social networking contacts, etc. It should be noted that the term "caller" refers to any party or entity that is requesting or has requested to communicate with the user of the device 102 using any type communication mechanism supported by the user device 102.

The call attribute manager 118 manages, detects, and retrieves various attributes associated with a caller, an incoming communication, or both. For example, the call attribute manager 118 is able to retrieve and receive information associated with the caller's current mood from one or more of the caller's social networking profiles 124 stored at one or more social networking servers 106. In another example, the call attribute manager 118 analyzes communication history information 126 to determine if the current incoming communication is associated with any unanswered communication requests by the same caller. In yet another example, the call attribute manager 118 determines an urgency of the incoming communication from the caller based on various flags associated with the communication, a number of associated incoming communications from the caller within a given amount of time, the tone or inflection of the caller's voice, and the like. It should be noted that the attributes associated with a caller or contact can be obtained in response to an incoming communication and/or can be obtained periodically at given intervals of time.

The indicator manager 120 selects and alters one or more incoming call indicators 128 (or other audible or tactile indicators), such as images, colors, patterns, videos, animations, and the like, based on the identified caller and the identified call attributes of an incoming call from the caller. The indicator presenter 122 then presents these incoming call indicators 128 to the user of the device 102. The indicators 128 can either be stored locally on the user device 102 or remotely on a server 108. In one example, the indicator manager 120 utilizes a set of indicator presentation criteria/rules 130 to determine which indicators 128 to select and alter based on the identified caller and the identified call attributes of the call from the caller. In one example, these indicator presentation criteria/rules 130 are globally applied to all contacts in the set of contact information 123. In another example, each contact or a plurality of contacts can be associated with its own set of indicator presentation criteria/rules 130. In another example, the indicator manager 120 receives one or more rule(s) from the communication server 109 that is/are to be applied to a given incoming communication. The ICM 112 and the above ICM components are discussed in greater detail below.

The communication server(s) 109 manages and facilitates the communications between user devices 102, 104 and other devices communicatively coupled to the network 110. It should be noted that one or more components of the ICM 112 can reside outside of the user device 102. For example, the communication server 109 (or any other server) can include the caller attribute manager 118. In this example, the communication server 109 identifies the call/caller attributes and sends this information to the user device 102. Additionally, the communication server 109 can also inform the user device 102 as to which incoming communication indicator 128 to present to the user of the incoming communication recipient user device 102 based on the identified call/caller attributes.

Incoming Communication Indicators

The following is a more detailed discussion on presenting incoming communication indicators to a user. It should be noted that although the following examples are given with respect incoming phone calls, the present disclosure is not limited to such an example. In other words, various examples of the present disclosure are applicable to any type of incoming communication such as, but not limited to, a P2P communication, an instant message, a text message, an email, or the like. Also, it should be clear that although a user of an originating device (i.e., that originates a communication destined for reception by the recipient user device), may be also referred to as a caller in the context of the present example with respect incoming phone calls, this user of the originating device is understood to be more generally a user of the originating device in various examples of the present disclosure.

In one example, a first user device 102 receives an incoming communication, such as a phone call, from a second user device 104. The incoming communication detector 114 determines that an incoming communication is being received. The caller identifier 116 analyzes the user's contact information 123 to determine which of the user's contacts (if any) are associated with the incoming communication, e.g., the incoming phone call. For example, the caller identifier 116 identifies the originating address, such as the phone number, of the incoming communication and analyzes the contact information 123 to identify a contact (i.e., a user of the second user device 104) that is associated with the originating address (i.e., the originating address of the second user device 104). If a contact cannot be identified, the user device 102 displays the originating address to the user of the first user device 102.

FIG. 2 shows one example of the contact information 123. In particular FIG. 2 shows a first column 202, labeled "Contact", comprising one or more entries that identify a given contact. For example, a first entry 204 under this column identifies "Contact A" and a second entry 206 under this column identifies "Contact B". The contact information 123 also includes communication address information (if available) for each contact listed first column 202. For example, FIG. 2 shows a number of columns 208, 210, 212 that include communication address information for various types of communication mechanisms. In particular, FIG. 2 shows a second column 208, labeled "Phone Number(s)", which comprises entries identifying one or more phone numbers for one or more contacts listed under the first column 202. For example, a first entry 214 under this column comprises a phone number for Contact A and a second entry 216 under this column comprises a phone for Contact B.

A third column 210, labeled "Email Address(es)", comprises entries identifying one or more email addresses for one or more contacts listed under the first column 202. For example, a first entry 218 under this column comprises an email address for Contact A and a second entry 220 under this column comprises an email address for Contact B. A fourth column 212, labeled "P2P Address", comprises entries identifying one or more P2P addresses for one or more contacts listed under the first column 202. For example, a first entry 222 under this column comprises a P2P address for Contact A and a second entry 224 under this column comprises a P2P address for Contact B.

The contact information 123 can also identify one or more images (if any) that are associated with a given contact. In particular, FIG. 2 shows a fifth column 226, labeled "Images", includes one or more entries identifying a set of images (if any) that are associated with a corresponding contact under the first column 202. For example, a first entry 228 under this column indicates that Contact A is associated with Image_1 and a second entry 230 under this column indicates that Contact B is not associated with any images. The images associated with a given contact are displayed to the user of the device 102 when an incoming communication is being received (or has been received) from the given contact. These images can be stored locally as part of (or separately from) the indicators 128 on the device 102 as well as remotely on a server 108.

A sixth column 232, labeled "Social Networking Information", comprises entries with information from a given contact's social networking profile 124. For example, a contact's current mood, such as happy, sad, excited, etc., relationship status, or the like can be stored under this column 232. FIG. 2 shows a first entry 234 under this column indicating that Contact A is happy and a second entry 236 under this column showing that Contact B is excited. In one example, the ICM 112 periodically queries a contact's social networking profile 124 to obtain the social networking information. In another example, the ICM 112 queries the contact's social networking profile 124 when an incoming communication is being received from the contact. In yet another example, the social network site comprising the contact's social networking profile 124 periodically pushes the contact's social networking information to the ICM 112. Also, the second user device 104 or the communication server 109 can obtain this information and send the information to the first user device 102.

A seventh column 238, labeled "Indicator Rule(s)", comprises entries that indicate the criteria/rule(s) 130 (if any) that the ICM 112 is to use when selecting an indicator 128 such as an image, altering an indicator, or the like to be displayed to the user to indicate an incoming communication. For example, a first entry 240 under this column indicates that Rule_1 and/or Rule_X is to be used when presenting an indicator for Contact A and a second entry 242 indicates that Rule_2 is to be used when presenting an indicator for Contact C. It should be noted one or more of the columns shown in FIG. 2 can be made optional or deleted. Also, one or more additional columns can be included as well. For example, the contact information 123 can also include event information such as birthday information, anniversary information, vacation, business meeting, and any other type of event associated with the contact. Even further, one or more sets of information such as the information under the "Image", "Social Networking Information", and "Indicator Rule(s)" columns 226, 232, 238 can be stored separately from the contact information 123.

As discussed above, the caller identifier 116 identifies the originating address, such as the phone number, of the incoming communication and analyzes the contact information 123 to identify a contact (e.g., a user of the second user device 104) that is associated with the originating address (e.g., the originating address of the second user device 104). For example, the caller identifier 116 determines that the originating address of the incoming communication is 555-123-4567. The caller identifier 116 then analyzes the contact information 123 to identify a contact associated with the address of 555-123-4567. Based on the example shown in FIG. 2, the caller identifier 116 determines that Contact A is associated with the address of 555-123-4567.

Once the caller identifier 116 has identified the incoming communication requestor (i.e., the caller in this example), the call attribute manager 118 identifies one or more attributes associated with the incoming communication and/or the identified caller. For example, the call attribute manager 118 can analyze the identified caller's social networking information within the contact information 123 or the social networking profiles 124 at the social networking server 106 to determine a current status of the caller. The current status of the caller can indicate a mood, such as happy, sad, excited, etc., of the caller, a vacation status, availability status, or the like. In addition, the call attribute manager 118 can analyze the contact information 123 to determine if today is the caller's birthday, anniversary, or the like. Even further, the call attribute manager 118 can analyze the communication history information 126 to determine how many times the caller has called within a given amount of time, how many consecutive calls associated with the caller were missed or not answered, etc. In one example, the call attribute manager 118 can receive call/caller attributes from the communication server 109, the second user device 104 that has initiated the incoming communication, or both.

The indicator manager 120 then identifies an appropriate indicator presentation rule(s) 130 based on the various call/caller attributes identified by the call attribute manager 118. In one example, the indicator presentation rule(s) 130 globally apply to each identified caller. However, in another example, one or more indicator presentation rules 130 are individually applied to one or more callers. For example, FIG. 2 shows that one or more contacts are associated with one or more indicator presentation rules 130. The indicator presentation rules 130 indicate which indicator 128 to select or how to modify an existing indicator 128 based on the various call/caller attributes identified by the call attribute manager 118. For example, one rule can indicate that if a current mood of the caller is happy then a happy image is selected. This rule can also indicate that if an image does not exist that matches the identified mood of the caller, then the indicator manager 120 is to modify an existing image to convey the current mood. For example, the indicator manager 120 can modify the facial expression of the caller in the image to display a happy expression.

In another example, the indicator presentation rule 130 can indicate that if today is the caller's birthday then an image is selected and/or modified to notify the user of the device 102 that today is the caller's birthday. For example, the indicator manager 120 can select an existing image of the caller and modify the image to indicate that today is the caller's birthday. In a further example, a rule 130 can indicate that for each successive missed call associated with the caller, an image is displayed with progressively more irritated expressions. Another rule 130 can indicate that if an image is not associated with the caller, then a new image is dynamically created by the indicator manager 120.

Alternatively, a rule 130 can indicate that if an image is not associated with the caller then one or more colors, patterns, and/or sequences thereof are to be selected or generated based on the various call/caller attributes identified by the call attribute manager 118. For example, the color green can be selected for presentation if the caller is happy, the color red can be selected for presentation if the caller is not happy or if the user has missed a given number of calls from the caller, etc. It should be noted that these are only a few examples of rules that are applicable. Also, audio or tactile stimuli can be utilized instead of or in addition to visual indicators. Additionally, the communication server 109 can instruct the indicator manager 120 as to which rule is to be used for a given caller.

Furthermore, the indicator manager 120 is not limited to identifying a rule and modifying an indicator 128 prior to the user answering or accepting the incoming communication. For example, the call attribute manager 118 can monitor for and detect call/caller attributes during the communication between the user and the caller. For example, the call attribute manager 118 can analyze the caller's voice to detect when the caller's emotions are changing, such as from happy to sad. In another example, the call attribute manager 118 can analyze the caller's voice to determine when the caller is telling the truth or telling a lie. Based on these in-communication attributes the indicator manager 120 can identify one or more applicable rules 130 and select, modify, or create an indicator 128, as discussed above.

Continuing with the example above where the caller identifier 116 has determined that Contact A is the caller, the indicator manager 120 analyzes the indicator presentation rules 130 or the contact information 123 to identify a set of indicator presentation rules 130 associated with Contact A based on the various call/caller attributes identified by the call attribute manager 118. In this example, the call attribute manager 118 has determined that Contact A is currently in a happy state based on Contact A's social networking information. The call attribute manager 118 has also determined that today is Contact A's birthday. Therefore, the indicator manager 120, in this example, identifies one or more indicator presentation rules 130 that are applicable to the call/caller attributes of a happy mood state and a birthday. Based on the contact information 123 and the identified call/caller attributes, the indicator manager 120 identifies Rule_1 and Rule_X as the applicable rules for Contact A.

The indicator manager 120 analyzes these indicator presentation rules 130 and based on Rule_1 determines that (1) an image of Contact A is to be selected where Contact A is smiling; (2) if this image of Contact A is not available, but another image exits then this other image is modified to show Contact A smiling; (3) If this image of Contact A is not available and another image of Contact A does not exist, a green color indicator is to be selected. Based on Rule_X the indicator manager 120 determines that (1) that a birthday cake is to be displayed with the image for Contact A; or (2) if a color indicator is to be used then the birthday cake is to be displayed with the color indicator. It should be noted that these rules are only illustrative examples and do not limit the present invention in any way.

The indicator manager 120 analyzes, for example, the contact information 123 (or any other relative information set) to determine if any images are associated with Contact A. As can be seen from FIG. 2, Image_1 is associated with Contact A. The indicator manager 120 then analyzes Image_1 or metadata associated with Image_1 to determine if Contact A is smiling in the image. It should be noted in some examples, Image_1 does not exist locally on the user device 102, but on a remote server 108. In these examples, the indicator manager 120 can retrieve the image from the remote server 108. It should also be noted that in examples where Contact A is not associated with an image on the device 102 or at the remote server 108, the indicator manager 120 can analyze Contact A's social networking profile to retrieve an image of Contact A therefrom. Even further, the first user device 102 can receive an image from the second user device 104 as part of the incoming communication request.

Figure 3:
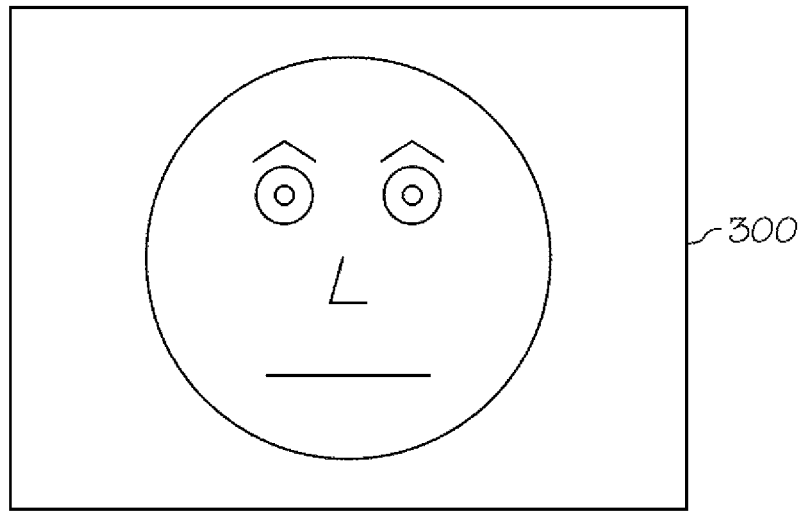
FIG. 3 shows an image with a first expression for use as an incoming communication indicator according to one example.
Figure 4:
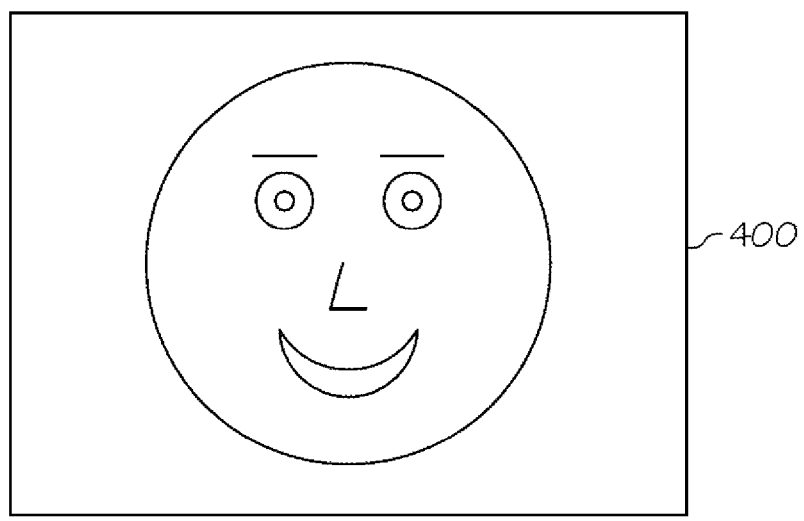
FIG. 4 shows the image of FIG. 3 after being modified to show a second expression according to one example.
Figure 5:
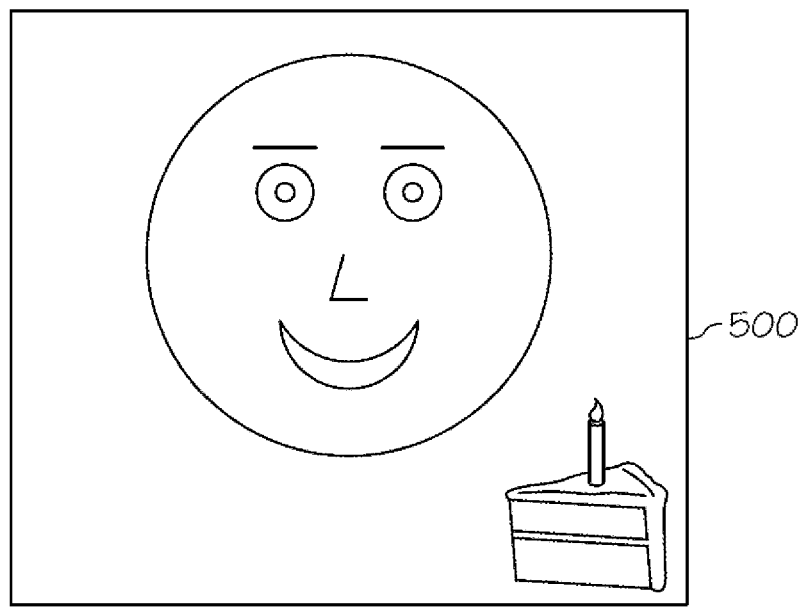
FIG. 5 shows the image of FIG. 4 after being further modified according to one example.
Figure 6:
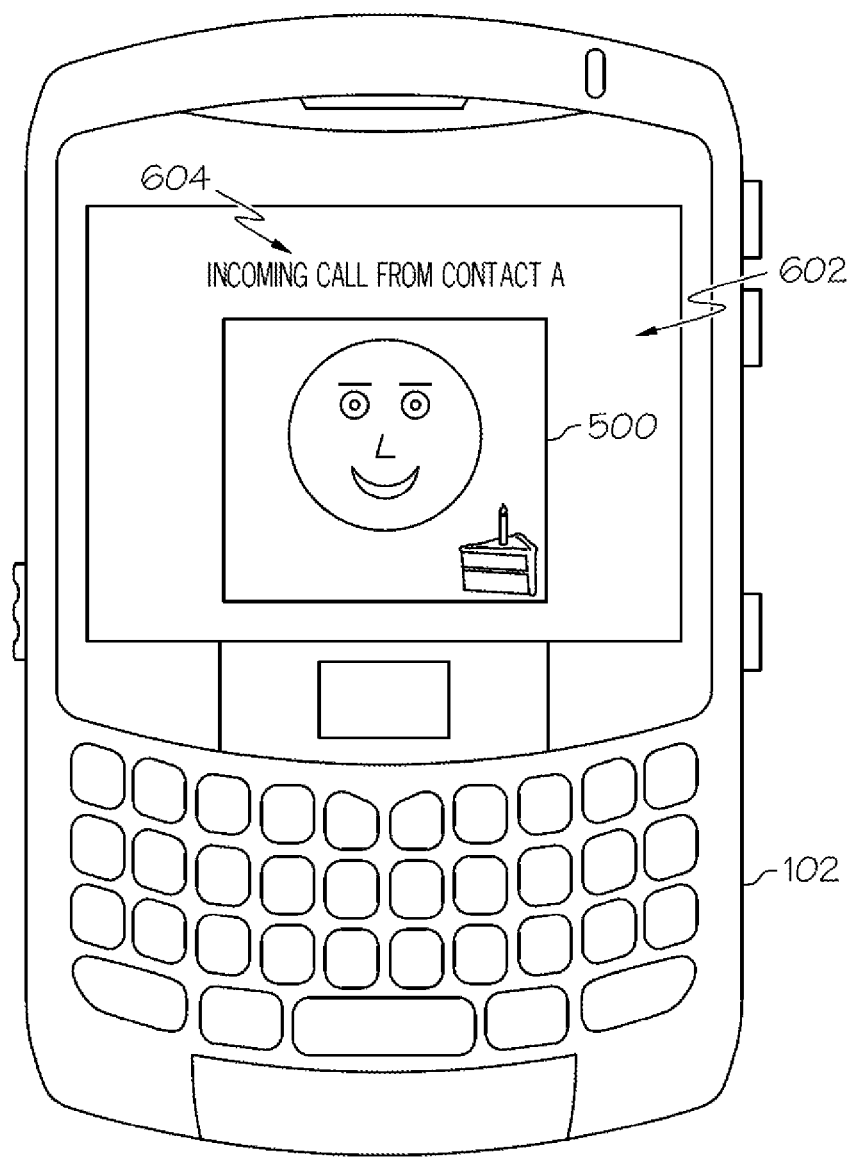
FIG. 6 shows the image of FIG. 5 being displayed to a user on an electronic device as an incoming communication indicator according to one example.

FIG. 3 shows one example of Image_1 300, which is a picture of Contact A. As discussed above, the indicator manager 120 analyzes this image 300 to determine of Contact A is smiling. As can be seen, Contact A is not smiling. Therefore, based on Rule_1, the indicator manager 120 modifies the image 300 shown in FIG. 3 to the image 400 shown in FIG. 4 where Contact A is smiling. Then, based on Rule_X, the indicator manager 120 further modifies Image_1 400 to include a birthday cake 502, as shown in the image 500 of FIG. 5. The indicator manager 120 can use any image alteration mechanism to transform the image from as shown in FIG. 3 to the images shown in FIGS. 4 and 5. Once the indicator manager 120 has completed selecting and modifying the image(s) associated with Contact A, the indicator presenter 122 presents this image 500 to the user via the display 602 of the user device 102, as shown in FIG. 6. In particular, FIG. 6 shows that an incoming communication notification 604 is being displayed to the user along with the image 500 indicating that Contact A is in a happy state and that today is also Contact's A birthday.

Figure 7:
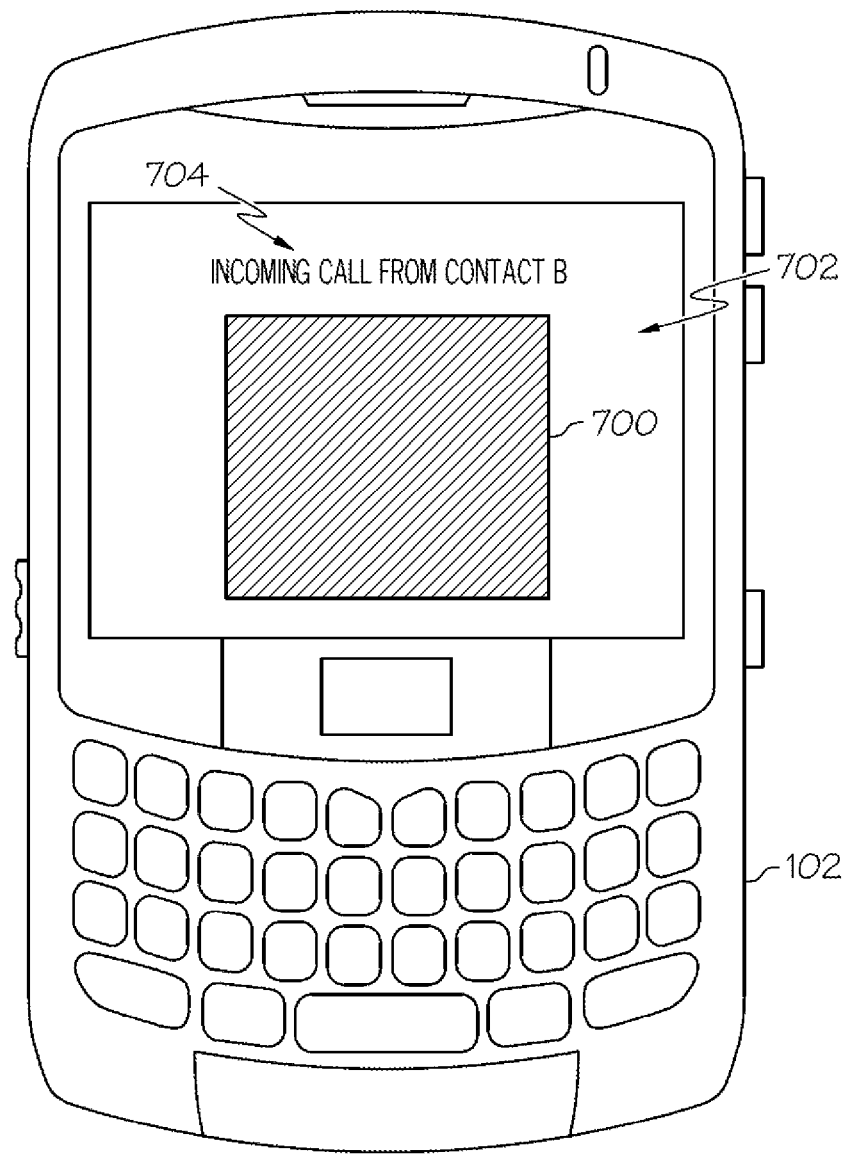
FIG. 7 shows a pattern being displayed to a user on an electronic device as an incoming communication indicator according to one example.

FIG. 7 shows another example of an indicator that can be displayed to a user based on the call/caller attributes and the indicator presentation rules 130 that have been identified. In the example of FIG. 7, the incoming communication detector 114 determines that the user device 102 is receiving an incoming communication, such as a phone call. The caller identifier 116 identifies the originating address, such as the phone number, of the incoming communication and analyzes the contact information 123 to identify a contact that is associated with the originating address. For example, the caller identifier 116 determines that the originating address of the incoming communication is 555-234-5678. The caller identifier 116 then analyzes the contact information 123 to identify a contact associated with the address of 555-234-5678. Based on the example shown in FIG. 2, the caller identifier 116 determines that Contact B is associated with the address of 555-234-5678.

Once the caller identifier 116 has identified the incoming communication requestor (i.e., the caller), the call attribute manager 118 identifies one or more attributes associated with the incoming communication and/or the identified caller, as discussed above. In this example, the call attribute manager 118 determines that Contact B is in an excited mood from the social networking information in the contact information 123 for Contact B. The indicator manager 120 then analyzes the indicator presentation rules 130 or the contact information 123 to identify a set of indicator presentation rules 130 associated with Contact B based on the various call/caller attributes identified by the call attribute manager 118.

In this example, the contact information 123 does not comprise any presentation rules 130 associated with Contact B. Therefore, the indicator manager 120 identifies a default rule from the plurality of rules 130 that is associated with an "excited" mood attribute. The indicator manager 120 further identifies, based on the contact information 123 (or image information stored separately from the contact information 123) that Contact B is not associated with an image. In this example, the identified rule instructs the indicator manager 120 to select a given pattern that represents an "excited" mood in response to an image not being available for Contact B. Therefore, based on the identified rule and the current state of Contact B, the indicator manager 120 selects a given pattern 700 that represents an "excited" state. The indicator presenter 122 then presents this pattern 700 to the user via the display 702 of the user device 102, as shown in FIG. 7. In particular, FIG. 7 shows that an incoming communication notification 704 is being displayed to the user along with the pattern 700 indicating that Contact B is in an excited state. It should be noted that various other visual indicators, such as text, colors, etc., can be used instead of a pattern.

Figure 8:
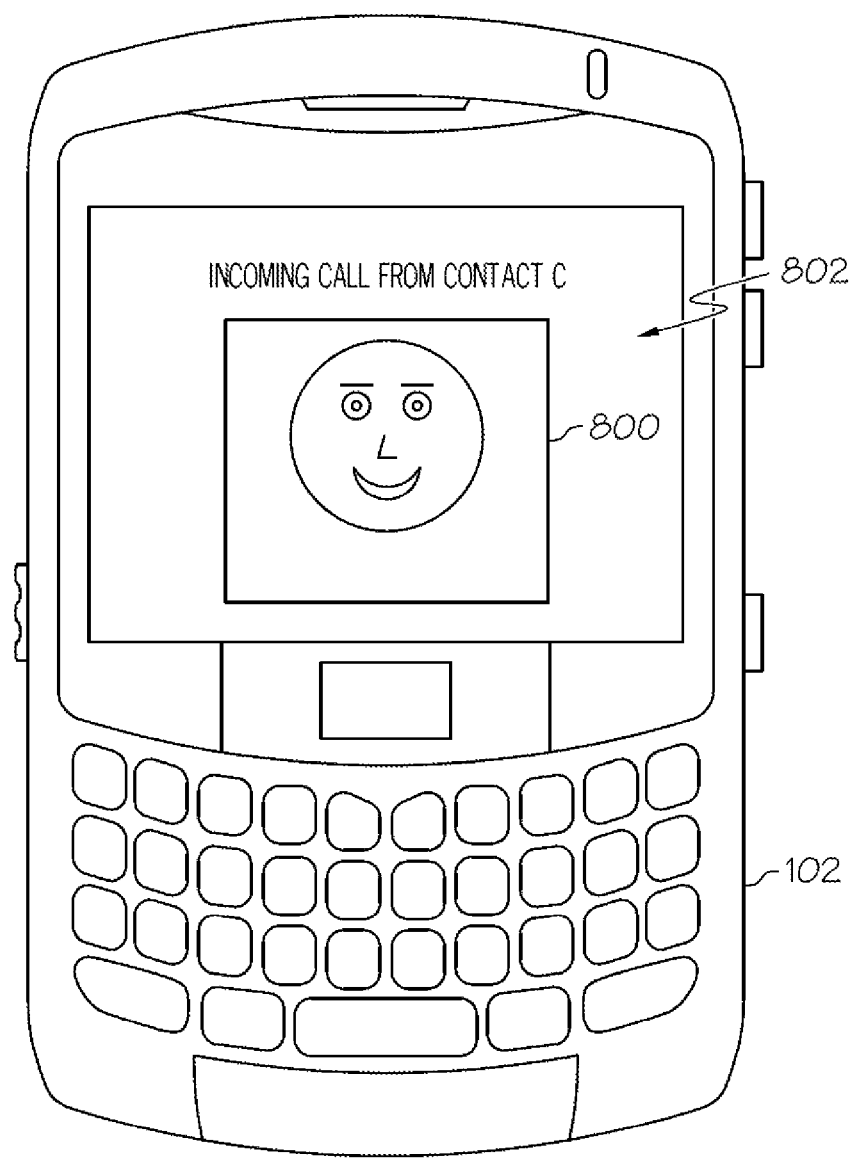
FIGS. 8-10 show a series of images with changing expressions being displayed to a user on an electronic device as an incoming communication indicator according to one example.
Figure 9:
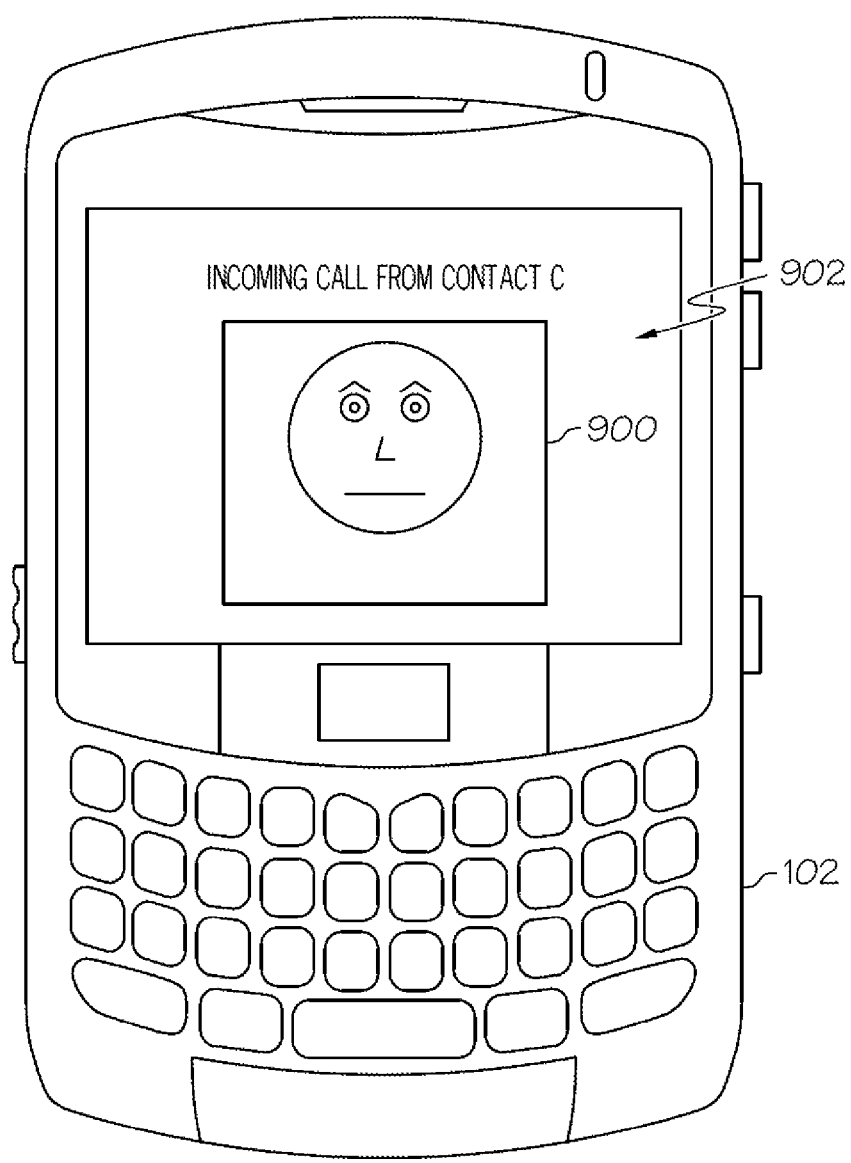
Figure 10:
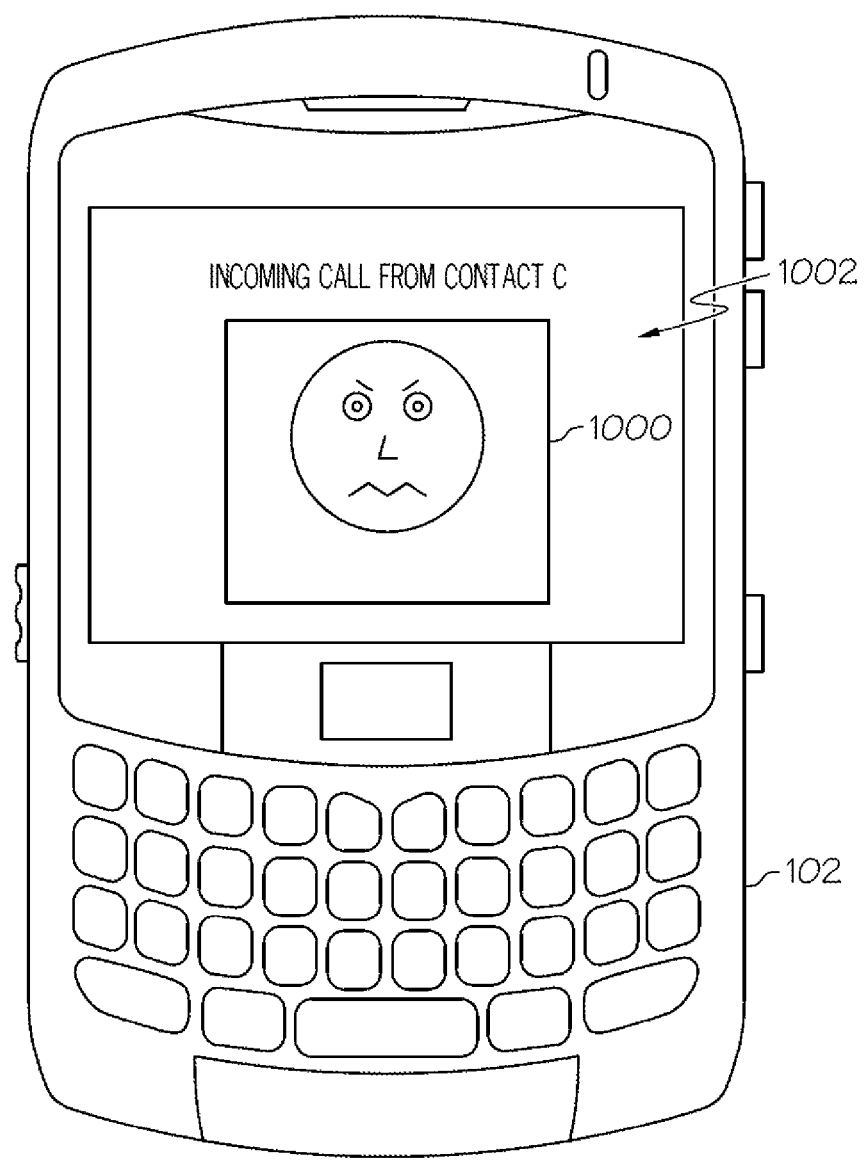

FIGS. 8-10 show another example of indicators that can be displayed to a user based on the call/caller attributes and the indicator presentation rules 130 that have been identified. In the example of FIGS. 8-10, images are selected or modified to show that the caller is becoming increasingly irritated that the user has not answered his/her calls. For example, the incoming communication detector 114 determines that the user device 102 is receiving an incoming communication, such as a phone call. The caller identifier 116 identifies the originating address, such as the phone number, of the incoming communication and analyzes the contact information 123 to identify a contact that is associated with the originating address. For example, the caller identifier 116 determines that the originating address of the incoming communication is 555-345-6789. The caller identifier 116 then analyzes the contact information 123 to identify a contact associated with the address of 555-345-6789. Based on the example shown in FIG. 2, the caller identifier 116 determines that Contact C is associated with the address of 555-345-6789.

Once the caller identifier 116 has identified the incoming communication requestor (i.e., the caller), the call attribute manager 118 identifies one or more attributes associated with the incoming communication and/or the identified caller, as discussed above. In this example, the call attribute manager 118 analyzes the communication history information 126 and determines that a missed call within a given amount of time is not associated with Contact C or that the previous call from Contact C was not missed. Therefore, the indicator manager 120 identifies one or more indicator presentation rules 130 associated with these attributes. In this example, the indicator manager 120 determines that Contact C is associated with Rule 2 that applies to these attributes, as shown in FIG. 2.

Rule 2, in this example, indicates that if a missed call within a given amount of time is not associated with the contact or if the previous call was not a missed call, then display (or create) a happy image. The indicator manager 120, based on the contact information 123, determines that Contact C is associated with a plurality of images. Therefore, the indicator manager 120 analyzes the images and/or the metadata of the images to identify an image where Contact C is conveying a happy expression. Once this image 800 is identified (or created, as discussed above), the indicator presenter 122 presents this image 800 to the user via the display 802 of the user device 102, as shown in FIG. 8.

In the current example, the user decides to not answer or misses Contact C's call. The first user device 102 then receives another incoming communication from Contact C. The call attribute manager 118 identifies one or more attributes associated with the incoming communication and/ or the identified caller, as discussed above. In this example, the call attribute manager 118 once again analyzes the communication history information 126 and determines that the previous call from Contact C was not answered. Based on the rule(s) (Rule 2 in this example) associated with this attribute, the indicator manager 120 determines that an image associated with Contact C is to be selected (and/or modified) that displays a more irritated expression than the previous image displayed for Contact C. As shown in FIG. 9, once this image 900 is selected (or created, as discussed above), the indicator presenter 122 presents this image 900 to the user via the display 902 of the user device 102. If the user fails to answer the next incoming communication from Contact C, an image 1000 with an even more irritated expression is presented to the user on the display 1002, as shown in FIG. 10.

Figure 11:
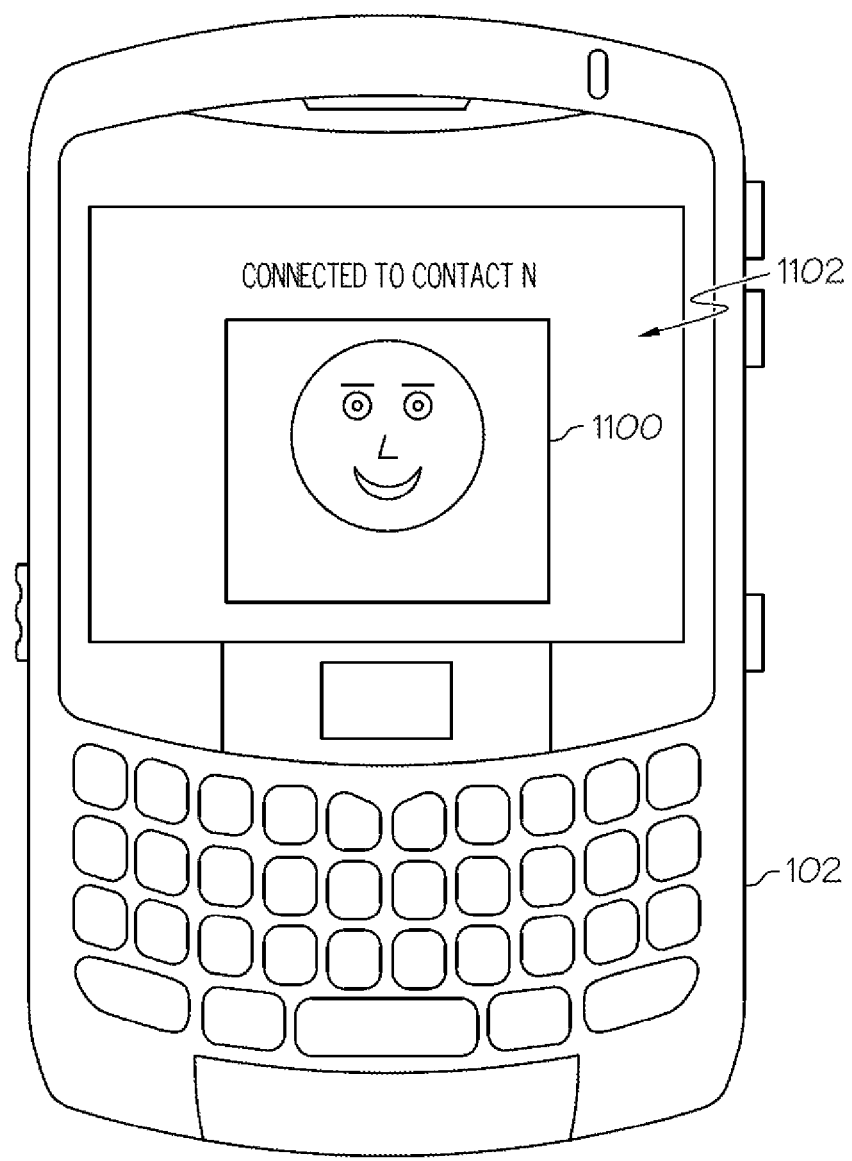
FIG. 11 shows a first image associated with a caller being displayed to a user on an electronic during a communication with the caller according to one example.
Figure 12:
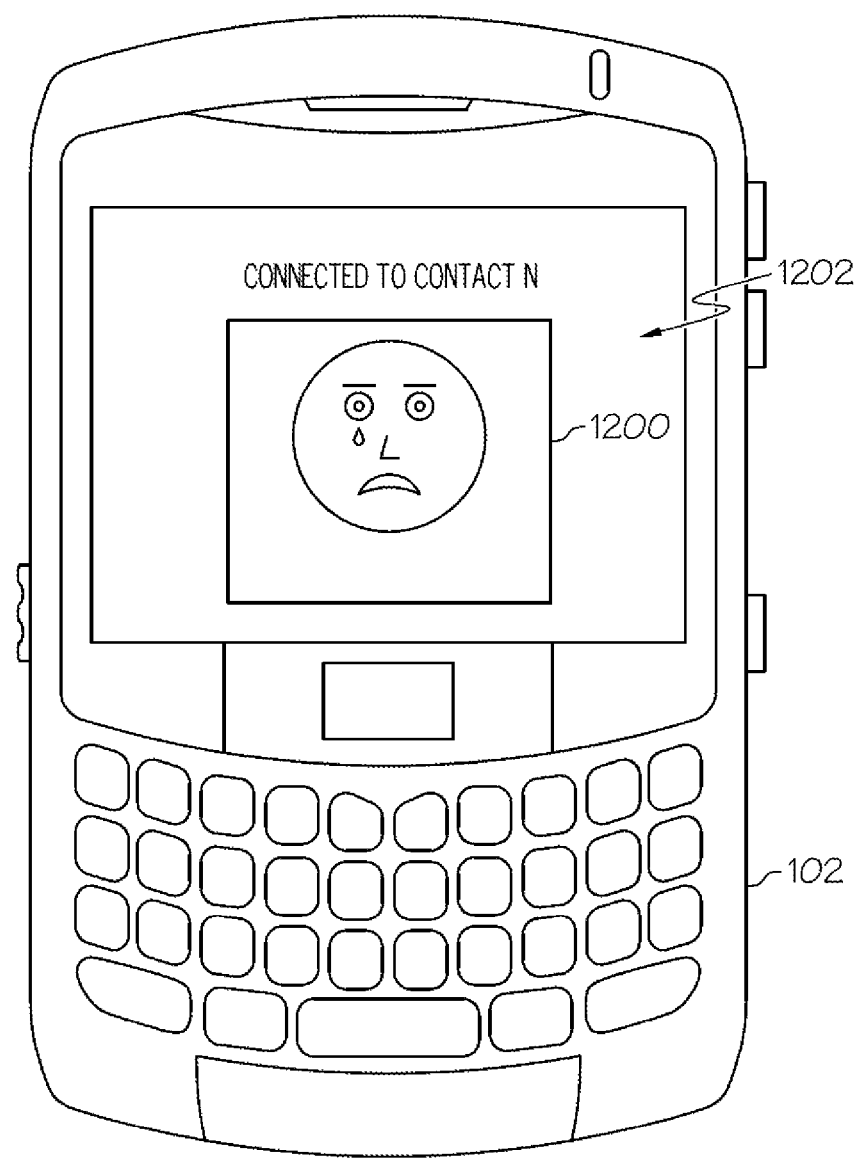
FIG. 12 shows the first image of FIG. 11 having been changed to a second image associated with the caller in response to an attribute of the caller changing during the communication according to one example.

In addition to displaying indicators 128 in response to an incoming call, the ICM 112 can also display indicators 128 during the communication as well. For example, during a conversation, the indicator manager 120 can monitor the caller's voice to detect changes in the caller's emotions, attitude, etc. The indicator manager 120 utilizes the indicator presentation rules 130 to determine which indicator to select or how to change the currently displayed indicator based on detected changes in the caller's emotion. For example, FIG. 11 shows an image 1100 associated with Contact N that is currently being presented on the display 1102 of the device 102 to the user during a communication with Contact N. As can be seen, the image 1100 shows that Contact N is currently in a happy state. However, during the conversation the indicator manager 120 detects that Contact N is becoming sad. Therefore, based on one or more of the indicator presentation rules 130, the indicator manager 120 selects a new image or dynamically modifies the currently displayed image 1100 to show that Contact N is currently sad. For example, FIG. 12 shows an image 1200 currently being presented on the display 1202 of the device 102 that shows that Contact N is currently sad.

As can be seen, various examples of the present invention discussed above provide multi-dimensional incoming communication indicators/notifications. For example, instead of displaying a phone number, name, or static image associated with a caller, one or more examples of the present invention provide indicators that identify the caller and various attributes associated therewith, such as the caller's current mood.

Operational Flow Diagram

Figure 13:
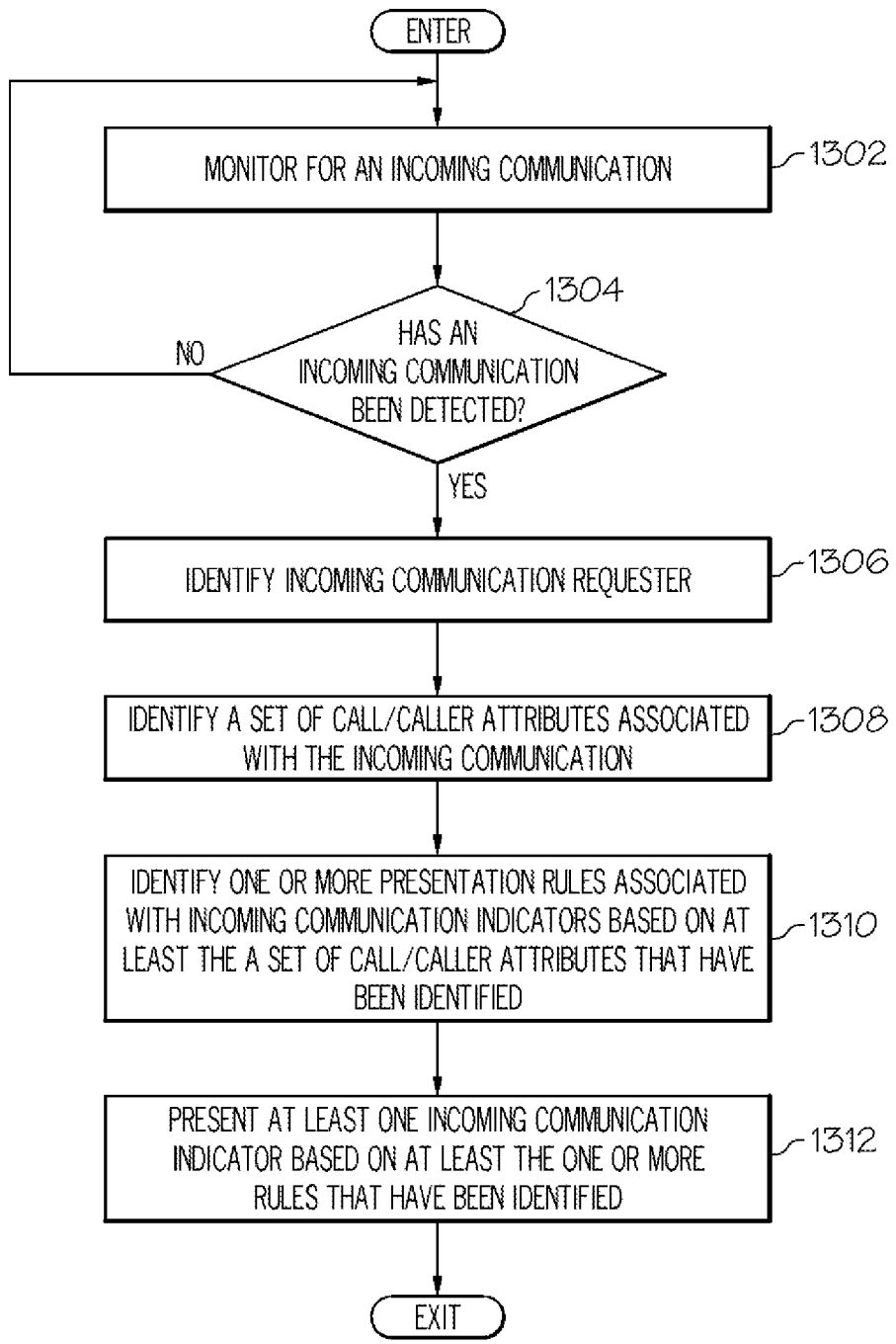
FIG. 13 is a flow diagram for an incoming communication indicator presentation process according to one example.

FIG. 13 is a flow diagram for an incoming communication indicator presentation process 1300. The incoming communication indicator presentation process 1300 presents one or more incoming communication indicators to a user of an electronic device based on one or more call/caller attributes associated with the incoming communication, as discussed above with respect to FIGS. 1-12. The indicator presentation process 1300 begins by the ICM 112, at step 1302, monitoring for an incoming communication such as, but not limited to a phone call. The ICM 112, at step 1304, determines if an incoming communication has been received. If the result of this determination is negative, the ICM 112 continues to monitor for an incoming communication. If the result of this process is positive, the ICM 112, at step 1306, identifies the incoming communication requestor (i.e., the "caller"). The ICM 112, at step 1308, identifies a set of call/caller attributes associated with the incoming communication and/or the identified requestor, as discussed above. The ICM 112, at step 1310, then identifies one or more indicator presentation rules 130 based at least on the identified call/caller attributes. The ICM 112, at step 1312, then presents at least one incoming communication indicator 128 to the user of user device 102 based on the indicator presentation rule(s) 130 that has been identified, as discussed above. The control flow then ends. The processes of steps 1302 to 1312 have been described above with respect to FIGS. 1-12 in greater detail.

Electronic Devices

Figure 14:
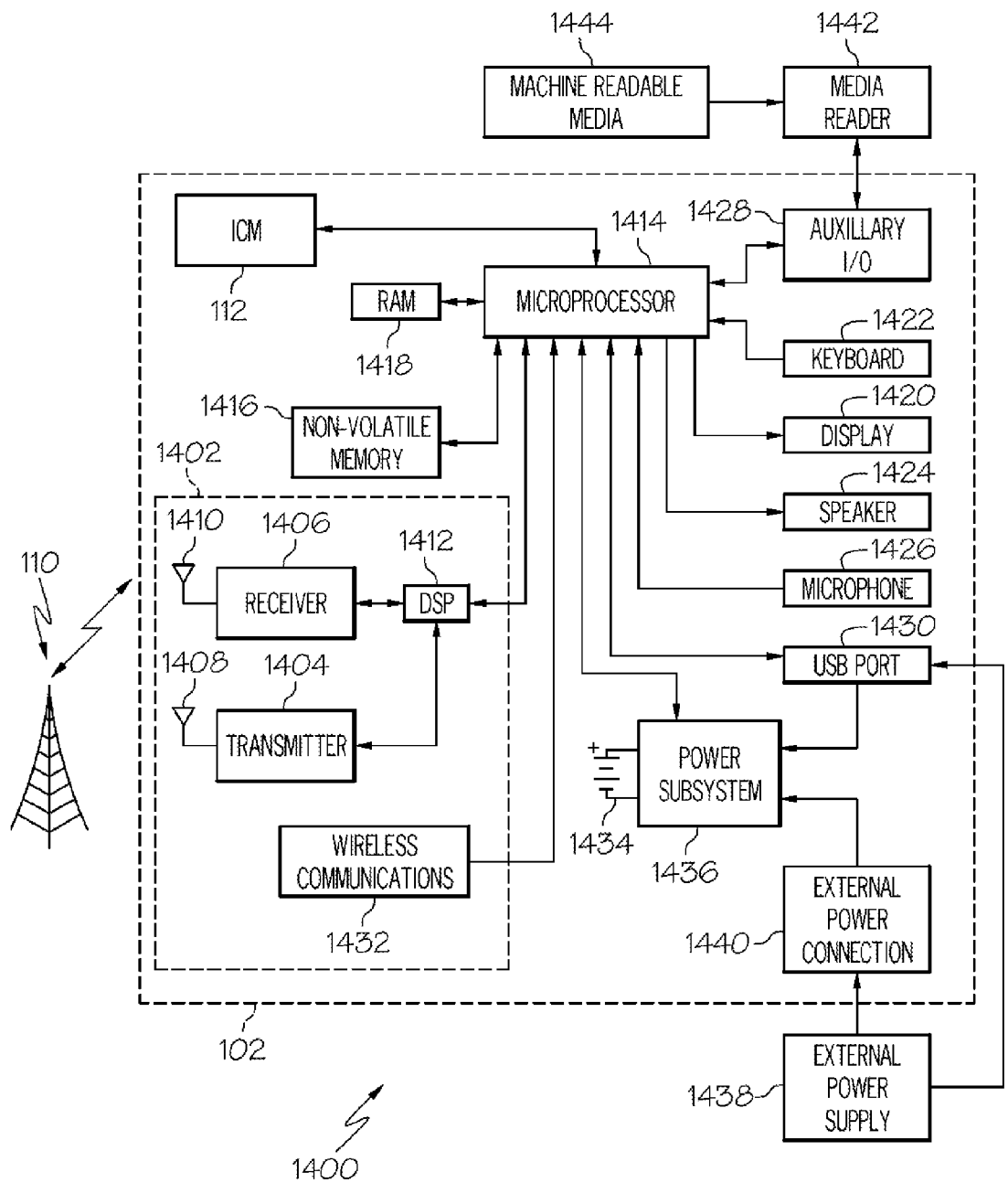
FIG. 14 is a block diagram of another electronic device and associated components in which the systems and methods disclosed herein may be implemented.

FIG. 14 is a block diagram of an example electronic device and associated components 1400 in which the systems and methods disclosed herein may be implemented. In this example, an electronic device is the user device 102, 104 discussed above with respect to FIGS. 1-13 and is a wireless two-way communication device with voice and data communication capabilities. Such electronic devices communicate with a wireless voice or data network 110 using a suitable wireless communications protocol. Wireless voice communications are performed using either an analog or digital wireless communication channel. Data communications allow the electronic device 102 to communicate with other computer systems via the Internet. Examples of electronic devices that are able to incorporate the above described systems and methods include, for example, a data messaging device, a two-way pager, a cellular telephone with data messaging capabilities, a tablet computing device, a wireless Internet appliance or a data communication device that may or may not include telephony capabilities.

The illustrated electronic device 102 is an example electronic device that includes two-way wireless communications functions. Such electronic devices incorporate a communication subsystem 1402 comprising elements such as a wireless transmitter 1404, a wireless receiver 1406, and associated components such as one or more antenna elements 1408 and 1410. A digital signal processor (DSP) 1412 performs processing to extract data from received wireless signals and to generate signals to be transmitted. The particular design of the communication subsystem 1402 is dependent upon the communication network and associated wireless communications protocols with which the device is intended to operate.

The electronic device 102 includes a microprocessor 1414 that controls the overall operation of the electronic device 102. The microprocessor 1414 interacts with the above described communications subsystem elements and also interacts with other device subsystems such as the ICM 112, the non-volatile memory 1416, random access memory (RAM) 1418, user interfaces such as a display 1420, a keyboard 1422, a speaker 1424, and a microphone 1426, auxiliary input/output (I/O) device 1428, Universal Serial Bus (USB) Port 1430, short and long range communication subsystems 1402, 1432, a power subsystem 1436 and any other device subsystems.

A battery 1434 is connected to a power subsystem 1436 to provide power to the circuits of the electronic device 102. The power subsystem 1436 includes power distribution circuitry for providing power to the electronic device 102 and also contains battery charging circuitry to manage recharging the battery 1434. An external power supply 1438 is able to be connected to an external power connection 1440 or through a USB port 1430.

The USB port 1430 further provides data communication between the electronic device 102 and one or more external devices, such as an information processing system. Data communication through USB port 1430 enables a user to set preferences through the external device or through a software application and extends the capabilities of the device by enabling information or software exchange through direct connections between the electronic device 102 and external data sources rather than via a wireless data communication network. In addition to data communication, the USB port 1430 provides power to the power subsystem 1436 to charge the battery 1434 or to supply power to the electronic circuits, such as microprocessor 1414, of the electronic device 102.

Operating system software used by the microprocessor 1414 is stored in non-volatile memory 1416. Further examples are able to use a battery backed-up RAM or other non-volatile storage data elements to store operating systems, other executable programs, or any combination of the above. The operating system software, device application software, or parts thereof, are able to be temporarily loaded into volatile data storage such as RAM 1418. Data received via wireless communication signals or through wired communications are also able to be stored to RAM 1418. As an example, a computer executable program configured to perform the incoming communication indicator presentation process 1300, discussed above, is included in a software module stored in non-volatile memory 1416.

The microprocessor 1414, in addition to its operating system functions, is able to execute software applications on the electronic device 102. A predetermined set of applications that control basic device operations, including at least data and voice communication applications, is able to be installed on the electronic device 102 during manufacture. Examples of applications that are able to be loaded onto the device may be a personal information manager (PIM) application having the ability to organize and manage data items relating to the device user, such as, but not limited to, e-mail, instant messaging, calendar events, voice mails, appointments, and task items.

Further applications may also be loaded onto the electronic device 102 through, for example, a wireless network 110, an auxiliary I/O device 1428, USB port 1430, communication subsystem 1402, or any combination of these interfaces. Such applications are then able to be installed by a user in the RAM 1418 or a non-volatile store for execution by the microprocessor 1414.

In a data communication mode, a received signal such as a text message or web page download is processed by the communication subsystem, including wireless receiver 1406 and wireless transmitter 1404, and communicated data is provided the microprocessor 1414, which is able to further process the received data for output to the display 1420, or alternatively, to an auxiliary I/O device 1428 or the USB port 1430. A user of the electronic device 102 may also compose data items, such as e-mail messages, using the keyboard 1422, which is able to include a complete alphanumeric keyboard or a telephone-type keypad, in conjunction with the display 1420 and possibly an auxiliary I/O device 1428. The keyboard 1422 may be a physical keyboard, or may be a virtual or "soft" keyboard implemented as key images rendered on a touchscreen display. Such composed items are then able to be transmitted over a communication network through the communication subsystem.

For voice communications, overall operation of the electronic device 102 is substantially similar, except that received signals are generally provided to a speaker 1424 and signals for transmission are generally produced by a microphone 1426. Alternative voice or audio I/O subsystems, such as a voice message recording subsystem, may also be implemented on the electronic device 102. Although voice or audio signal output is generally accomplished primarily through the speaker 1424, the display 1420 may also be used to provide an indication of the identity of a calling party, the duration of a voice call, or other voice call related information, for example.

Depending on conditions or statuses of the electronic device 102, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short range wireless communications subsystem 1432 is a further optional component which may provide for communication between the electronic device 102 and different systems or devices such. However these different systems or devices need not necessarily be similar devices as discussed above. The wireless communications subsystem 1432 comprises one or more wireless transceivers, optionally associated circuits and components, and an optional infrared device for communicating over various networks such implementing one or more wireless communication technologies such as, but not limited to, Bluetooth® and/or a wireless fidelity technologies.

A media reader 1442 is able to be connected to an auxiliary I/O device 1428 to allow, for example, loading computer readable program code of a computer program product into the electronic device 102 for storage into non-volatile memory 1416. One example of a media reader 1442 is an optical drive such as a CD/DVD drive, which may be used to store data to and read data from a computer readable medium or storage product such as machine readable media (computer readable storage media) 1444. Examples of suitable computer readable storage media include optical storage media such as a CD or DVD, magnetic media, or any other suitable data storage device. Media reader 1442 is alternatively able to be connected to the electronic device through the USB port 1430 or computer readable program code is alternatively able to be provided to the electronic device 102 through the wireless network 110.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method with an electronic device, the method comprising:
   receiving an incoming communication comprising an originating address;
   identifying a user associated with the originating address;
   identifying a set of attributes associated with the incoming communication;
   selecting at least one incoming communication indicator presentation rule based on at least one of the user that has been identified and the set of attributes that have been identified;
   determining that at least one attribute in the set of attributes associated with the incoming communication indicates a mood of the user associated with the originating address;
   selecting an image associated with the user associated with the originating address based on the incoming communication indicator presentation rule and the attribute indicating the mood of the user, wherein the image expresses the mood of the user; and
   presenting the image as an incoming communication indicator based on the incoming communication indicator presentation rule that has been selected.

2. The method of claim 1, further comprising:
   determining that the image fails to express the mood of the user;
   modifying the image to express the mood of the user; and
   presenting the image as the incoming communication indicator.

3. The method of claim 1, wherein identifying a set of attributes associated with the incoming communication further comprises:
   identifying social networking information associated with the user, where the social networking information is obtained from a third party server.

4. The method of claim 1, further comprising:
   determining that at least one attribute in the set of attributes is a number of missed communications associated with the user;
   selecting an image associated with the user based on the incoming communication indicator presentation rule and the number of missed communications; and
   presenting the image as the incoming communication indicator.

5. The method of claim 1, further comprising:
   modifying the incoming communication indicator based on the set of attributes that has been identified.

6. The method of claim 1, wherein the incoming communication is at least one of:
   a telephone call;
   a multimedia message;
   a video call;
   a short service message;
   an email message;
   an instant message; and
   a pin based peer-to-peer message.

7. The method of claim 1, wherein the set of attributes comprises at least one of:
   a current mood of the user;
   a number of missed communications associated with the user;
   a number of unread communications associated with the user;
   an urgency of the incoming communication; and
   an event associated with the user.

8. The method of claim 1, wherein the incoming communication indicator is at least one of:
   a generic image;
   an image associated with the user;
   one or more colors;
   one or more patterns;
   one or more audio files;
   one or more videos;
   one or more animations; and
   one or more tactile events.

9. The method of claim 1, wherein the incoming communication indicator is presented on a wireless communication device.

10. An electronic device comprising:
    a processor;
    a memory communicatively coupled to the processor; and
    an incoming communication manager communicatively coupled to the processor and the memory, the incoming communication manager configured to perform a method comprising:
      receiving an incoming communication comprising an originating address;
      identifying a user associated with the originating address;

identifying a set of attributes associated with the incoming communication;

selecting at least one incoming communication indicator presentation rule based on at least one of the user that has been identified and the set of attributes that have been identified;

determining that at least one attribute in the set of attributes associated with the incoming communication indicates a mood of the user associated with the originating address;

selecting an image associated with the user associated with the originating address based on the incoming communication indicator presentation rule and the attribute indicating the mood of the user, wherein the image expresses the mood of the user; and presenting the image as an incoming communication indicator based on the incoming communication indicator presentation rule that has been selected.

11. The electronic device of claim 10, the method further comprising:

determining that the image fails to express the mood of the user;

modifying the image to express the mood of the user; and presenting the image as the incoming communication indicator.

12. The electronic device of claim 10, wherein identifying a set of attributes associated with the incoming communication further comprises:

identifying social networking information associated with the user, where the social networking information is obtained from a third party server.

13. The electronic device of claim 10, the method further comprising:

determining that at least one attribute in the set of attributes is a number of missed communications associated with the user;

selecting an image associated with the user based on the incoming communication indicator presentation rule and the number of missed communications; and presenting the image as the incoming communication indicator.

14. The electronic device of claim 10, the method further comprising:

modifying the incoming communication indicator based on the set of attributes that has been identified.

15. The electronic device of claim 10, wherein the set of attributes comprises at least one of:

a current mood of the user;

a number of missed communications associated with the user;

a number of unread communications associated with the user;

an urgency of the incoming communication; and an event associated with the user.

16. A computer program product comprising a non-transitory storage medium readable by a processor and storing instructions for execution by the processor for performing a method comprising:

receiving an incoming communication comprising an originating address;

identifying a user associated with the originating address;

identifying a set of attributes associated with the incoming communication;

selecting at least one incoming communication indicator presentation rule based on at least one of the user that has been identified and the set of attributes that have been identified;

determining that at least one attribute in the set of attributes associated with the incoming communication indicates a mood of the user associated with the originating address;

selecting an image associated with the user associated with the originating address based on the incoming communication indicator presentation rule and the attribute indicating the mood of the user, wherein the image expresses the mood of the user; and presenting the image as an incoming communication indicator based on the incoming communication indicator presentation rule that has been selected.

17. The computer program product of claim 16, the method further comprising:

modifying the incoming communication indicator based on the set of attributes that has been identified.

18. The computer program product of claim 16, the method further comprising:

determining that the image fails to express the mood of the user;

modifying the image to express the mood of the user; and presenting the image as the incoming communication indicator.

* * * * *